(No Model.)
G. R. VICKERS, Jr.
STOCK FOR FIRE ARMS.
No. 287,741. Patented Oct. 30, 1883.
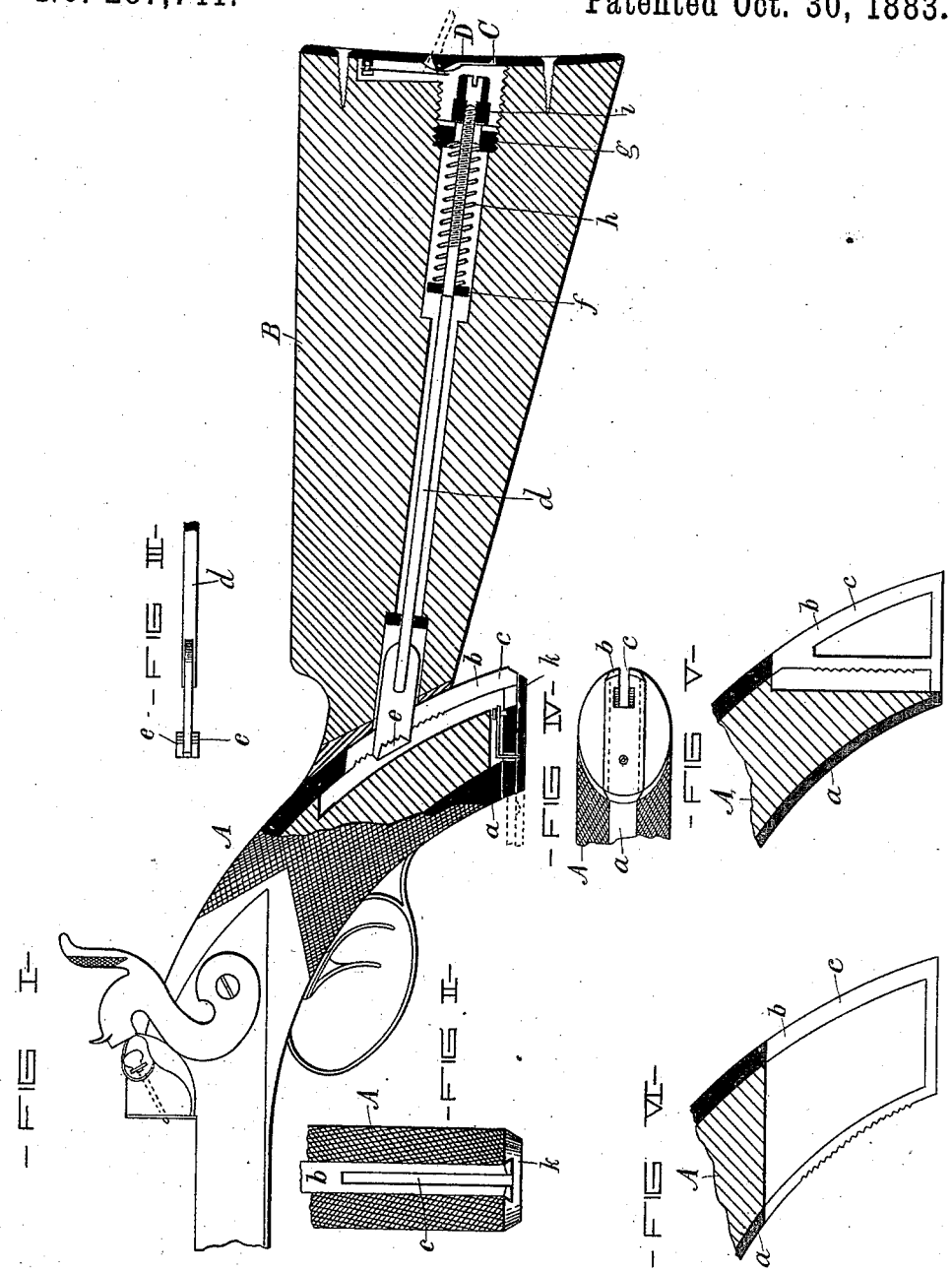

United States Patent Office.

GEORGE R. VICKERS, JR., OF BALTIMORE, MARYLAND.

STOCK FOR FIRE-ARMS.

SPECIFICATION forming part of Letters Patent No. 287,741, dated October 30, 1883.

Application filed August 23, 1883. (No model.)

*To all whom it may concern:*

Be it known that I, GEORGE R. VICKERS, Jr., of the city of Baltimore and State of Maryland, have invented certain Improvements in Fire-Arms, of which the following is a specification.

This invention relates to certain improvements in that class of guns in which the pistol grip-stock is used; and it consists in means whereby the shoulder-piece may be adjusted with reference to the grip, as will hereinafter fully appear.

In the accompanying drawings, forming a part hereof, Figure I is a partly sectional view of a portion of a breech-loading gun provided with my improvements. Figs. II, III, and IV are details of the invention; and Figs. V and VI illustrate a modified construction of a portion of the invention.

Similar letters of reference indicate similar parts in all the views.

A and B are respectively the grip and the shoulder-piece of the stock. The front and rear ribs of the grip-stock A are indicated by $a$ and $b$, respectively, and it will be seen that the rib $b$ is slotted, the said slot being denoted by $c$. The shoulder-piece B has a rod, $d$, the outer end of which is accessible from the end of the shoulder-piece, and its inner end is provided with toothed projections $e$, which engage with the similarly toothed inner surface of the rib $b$.

The rod $d$ has a collar, $f$, and between the said collar and the stock $g$ is confined a spiral spring, $h$. The toothed projections $e$ of the rod $d$, when drawn in contact with the toothed surface of the rib $b$ by means of a nut, $i$, serve to hold the shoulder-piece firmly in contact with the grip; and the length of the toothed surface of the rib $b$ is such that considerable adjustment in the offset of the shoulder-piece may be obtained.

The lower end of the slot $c$ is covered by a sliding plate, $k$, which is thrown back, as shown in dotted lines, when the bar $d$ is to be entirely removed from the grip.

The object of the spring $h$ is to force the toothed projections $e$ from the toothed surface of the rib $b$ as the nut $i$ is unscrewed, to admit of the adjustment of the shoulder-piece.

A screw-driver for turning the nut $i$ is inserted through an opening, C, in the plate of the shoulder-piece, which is provided with a spring-door, D. In Fig. V the teeth of the rod $d$ engage with a bar which is independent of the rib $b$; and in Fig. VI the said rod extends entirely through the grip, and the outer surface of the rib $a$ is toothed.

I claim as my invention—

1. The shoulder-piece of the gun-stock, having extending through it a rod with a toothed surface, adapted to be brought and held in contact with a toothed surface in the grip-stock, substantially as and for the purpose specified.

2. In combination with the grip A, having a toothed inner surface, the shoulder B, the rod $d$, with the toothed projections $e$, and means for drawing and holding in contact the two toothed surfaces, and thereby firmly hold the two sections of the gun-stock together, substantially as specified.

GEORGE R. VICKERS, JR.

Witnesses:
WM. T. HOWARD,
EDWARD J. DIGGS.